US012603962B2

(12) United States Patent
Sasaki

(10) Patent No.: US 12,603,962 B2
(45) Date of Patent: Apr. 14, 2026

(54) INFORMATION PROCESSING APPARATUS, NON-TRANSITORY COMPUTER READABLE MEDIUM, AND METHOD

(71) Applicant: FUJIFILM Business Innovation Corp., Tokyo (JP)

(72) Inventor: Hirotaka Sasaki, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 455 days.

(21) Appl. No.: 18/177,218

(22) Filed: Mar. 2, 2023

(65) Prior Publication Data

US 2024/0106952 A1 Mar. 28, 2024

(30) Foreign Application Priority Data

Sep. 26, 2022 (JP) ................................. 2022-152947

(51) Int. Cl.
H04N 1/00 (2006.01)

(52) U.S. Cl.
CPC . H04N 1/00891 (2013.01); H04N 2201/0094 (2013.01)

(58) Field of Classification Search
CPC .................... H04N 1/00891; H04N 2201/0094
USPC ........................................................ 358/1.13
See application file for complete search history.

(56) References Cited

U.S. PATENT DOCUMENTS

| | | | | |
|---|---|---|---|---|
| 8,024,592 B2 * | 9/2011 | Hada | .................. | H04N 1/32512 |
| | | | | 713/323 |
| 8,547,564 B2 * | 10/2013 | Ito | ...................... | H04N 1/00278 |
| | | | | 709/224 |
| 8,848,256 B2 * | 9/2014 | Sasaki | ................ | H04N 1/00061 |
| | | | | 358/1.14 |
| 2011/0176171 A1 * | 7/2011 | Hagiuda | ............ | G03G 15/5083 |
| | | | | 358/1.15 |

FOREIGN PATENT DOCUMENTS

JP          2017-196907 A          11/2017

* cited by examiner

*Primary Examiner* — Allen H Nguyen
(74) *Attorney, Agent, or Firm* — OLIFF PLC

(57) ABSTRACT

An information processing apparatus includes a processor. A first power-off state, which accompanies a restart of a program, and a second power-off state, which does not accompany the restart of the program, are defined as states of a power supply of the information processing apparatus. The processor is configured to change, if an operation for turning off the information processing apparatus is performed, a state of the power supply to the first power-off state or the second power-off state in accordance with a use condition of the information processing apparatus before the operation for turning off the information processing apparatus is performed.

7 Claims, 3 Drawing Sheets

TIME

OPERATION A    POWER-OFF    POWER-ON    ·NO OPERATION    POWER-OFF
             OPERATION 1    OPERATION    ·OPERATION B    OPERATION 2

INFORMATION PROCESSING APPARATUS, NON-TRANSITORY COMPUTER READABLE MEDIUM, AND METHOD

CROSS-REFERENCE TO RELATED APPLICATIONS

This application is based on and claims priority under 35 USC 119 from Japanese Patent Application No. 2022-152947 filed Sep. 26, 2022.

BACKGROUND

(i) Technical Field

The present disclosure relates to an information processing apparatus, a non-transitory computer readable medium, and a method.

(ii) Related Art

Japanese Unexamined Patent Application Publication No. 2017-196907 describes an image forming apparatus that saves a first state at a time when an operation for turning off a power switch is detected and, when another operation for turning on the power switch is then detected, changes a state thereof to a second state, in which the first state can be restored. In the second state, the image forming apparatus starts to measure time and, if an operation for turning on the power switch is detected in the second state, restarts or is restored to the saved first state.

SUMMARY

A first power-off state, which accompanies a restart of programs, and a second power-off state, which does not accompany the restart of the programs, might be defined as states of a power supply of an apparatus. In general, time taken, when a power supply is in the second power-off state, to restore devices included in an apparatus after an operation for turning on the apparatus is performed is shorter than time taken, when the power supply is in the first power-off state, to restore the devices after an operation for turning on the apparatus is performed.

If an abnormality occurs in an apparatus, a user might perform an operation for turning off and then on the apparatus in order to eliminate the abnormality. If the power supply enters the first power-off state as a result of an operation for turning off the apparatus after an abnormality that can be eliminated by restarting programs occurs, the abnormality can be eliminated. If the power supply enters the second power-off state, however, the abnormality might not be eliminated.

When an apparatus or a system can detect occurrence of an abnormality therein, the abnormality can be eliminated by changing a state of a power supply of the apparatus or the system to the first power-off state after an operation for turning off the apparatus or the system is performed. When it is difficult for the apparatus or the system to detect occurrence of an abnormality therein, however, the abnormality might not be eliminated if the power supply enters the second power-off state. When an abnormality that has occurred can be eliminated by establishing the second power-off state but the power supply invariably enters the first power-off state, time taken to restore devices undesirably become longer than when the power supply enters the second power-off state.

Aspects of non-limiting embodiments of the present disclosure relate to elimination of an abnormality that has occurred in an apparatus through an operation for turning off the apparatus, when a first power-off state, which accompanies a restart of programs, and a second power-off state, which does not accompany the restart of the programs, are defined as states of a power supply of the apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor, wherein a first power-off state, which accompanies a restart of a program, and a second power-off state, which does not accompany the restart of the program, are defined as states of a power supply of the information processing apparatus, and wherein the processor is configured to change, if an operation for turning off the information processing apparatus is performed, a state of the power supply to the first power-off state or the second power-off state in accordance with a use condition of the information processing apparatus before the operation for turning off the information processing apparatus is performed.

BRIEF DESCRIPTION OF THE DRAWINGS

An exemplary embodiment of the present disclosure will be described in detail based on the following figures, wherein:

FIG. 1 is a block diagram illustrating the hardware configuration of an image forming apparatus according to an exemplary embodiment;

FIG. 2 is a diagram illustrating timings of operations performed on the image forming apparatus.

DETAILED DESCRIPTION

Figure 3:
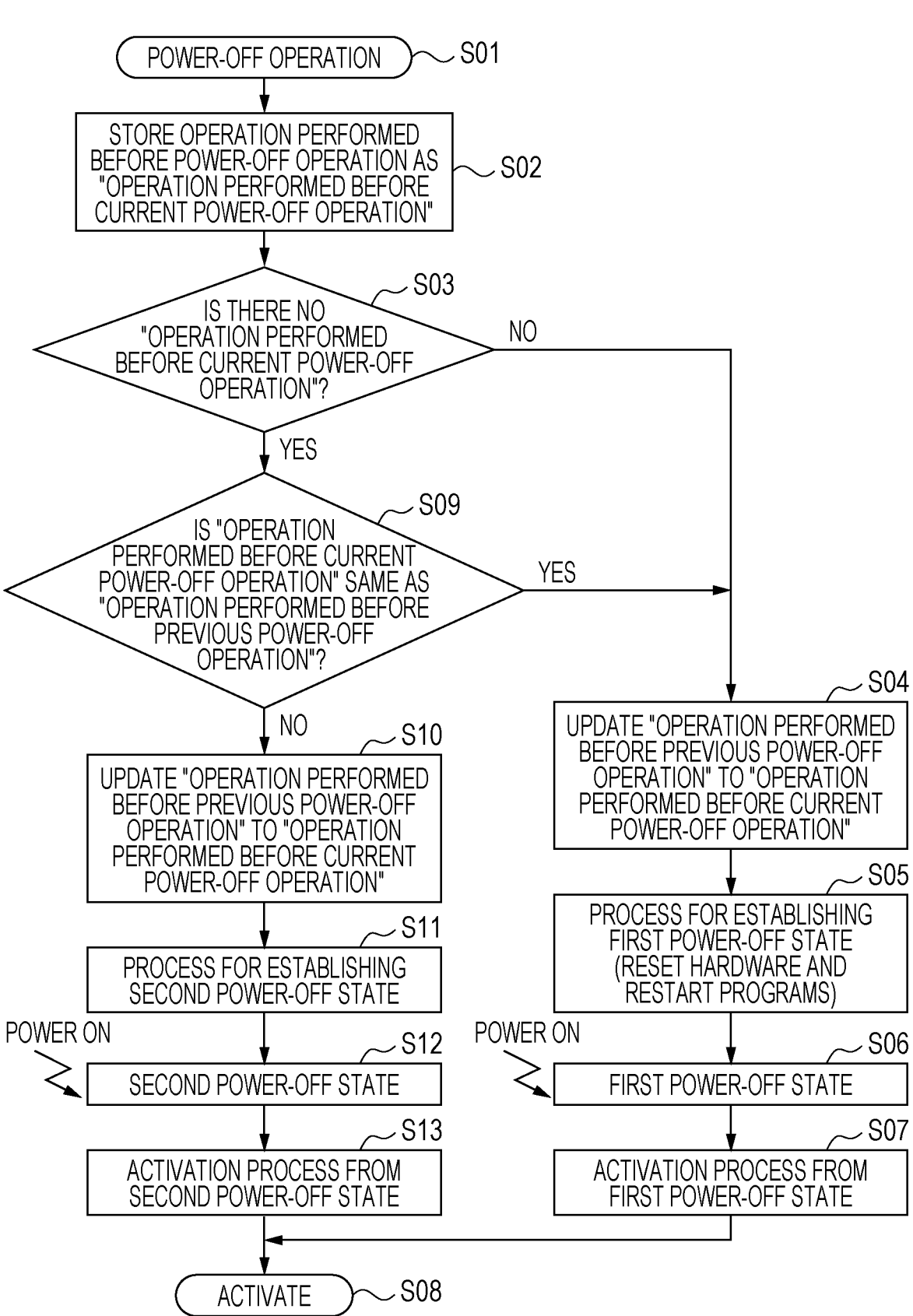
FIG. 3 is a flowchart illustrating how the image forming apparatus operates.

An information processing apparatus according to an exemplary embodiment will be described hereinafter. The information processing apparatus according to the exemplary embodiment has a function of controlling supply of power thereto, and may be any apparatus having the function.

States of a power supply of the information processing apparatus (i.e., power supply states) will be described. The states of the power supply of the information processing apparatus include, for example, a power-on state, an all-power-off state, a sub-power-off state, and a suspended state. These states of the power supply are examples, and other states of the power supply may be defined, instead.

The power-on state is a state where power is supplied to devices (i.e., hardware) included in the information processing apparatus and the information processing apparatus has been activated and a state where the information processing apparatus can perform processes and operations.

The all-power-off state is a state where power is not supplied to the devices included in the information processing apparatus at all and the devices are not energized at all. A state where the power supply of the information processing apparatus is unplugged, for example, corresponds to the all-power-off state.

The sub-power-off state is a state where the power supply of the information processing apparatus is plugged and a state where the information processing apparatus can be activated by performing an operation for turning on the information processing apparatus (e.g., pressing a power button). A state where power is supplied to only some of the devices included in the information processing apparatus (e.g., a memory and a device for detecting pressing of the power button) and only these devices are energized, for example, corresponds to the sub-power-off state.

In the sub-power-off state, the devices (i.e., hardware) are reset and programs (i.e., software) are restarted. When a user performs an operation for turning off the information processing apparatus (e.g., presses the power button) and the power supply enters the sub-power-off state from the power-on state, for example, the devices are reset and the programs are restarted. The devices may be reset and the programs may be restarted when the user performs an operation for turning on the information processing apparatus (e.g., presses the power button) with the power supply in the sub-power-off state to change the state of the power supply from the sub-power-off state to the power-on state, instead.

That is, the sub-power-off state is a power-off-state accompanying at least the restart of the programs. The programs may be restarted when the power supply enters the sub-power-off state from the power-on state or enters the power-on state from the sub-power-off state, instead. The devices may be reset, too, when the power enters the sub-power-off state from the power-on state or enters the power-on state from the sub-power-off state.

In the all-power-off state, too, the devices are reset and the programs are restarted. The all-power-off state, therefore, is a power-off state accompanying at least the restart of the programs. The devices may be reset and the programs may be restarted when the power enters the all-power-off state from the power-on state or enters the power-on state from the all-power-off state, instead. When an operation for turning off the information processing apparatus is performed, for example, the power supply enters the sub-power-off state from the power-on state. The devices are reset and the programs are restarted at this time. The power supply then enters the all-power-off state when the power supply is unplugged. The devices may be reset and the programs may be restarted after an operation for turning on the information processing apparatus is performed, instead.

When an operation for turning on the information processing apparatus is performed (e.g., the power button is pressed) with the power supply in the sub-power-off state, the power supply is restored to the power-on state from the sub-power-off state, and the information processing apparatus is activated.

The suspended state is a state of the power supply achieved by executing a suspension function of the information processing apparatus. The suspended state is a state where the power supply of the information processing apparatus is plugged and a state where the information processing apparatus can be activated by performing an operation for turning on the information processing apparatus (e.g., pressing the power button). A state where power is supplied to only some of the devices included in the information processing apparatus (e.g., the memory and the device for detecting pressing of the power button) and only these devices are energized, for example, corresponds to the suspended state. Power necessary to hold data is supplied to the memory.

In the suspended state, unlike in the sub-power-off state, the devices are not reset and the programs are not restarted.

That is, the suspended state can be regarded as a power-off state that does not accompany a restart of the programs.

When an operation for turning off the information processing apparatus is performed (e.g., the power button is pressed) and the power supply enters the suspended state from the power-on state, information indicating states of programs executed before the power supply enters the suspended state (i.e., states of programs executed before an operation for turning off the information processing apparatus) is stored in a memory (e.g., a random-access memory (RAM)).

When an operation for turning on the information processing apparatus is performed (e.g., the power button is pressed) with the power supply in the suspended state, the power supply is restored to the power-on state from the suspended state, and the information processing apparatus is activated. At this time, the programs are not restarted and are restored to the states stored in the memory. As a result, time taken to restore the power supply becomes shorter than when the power supply is restored to the power-on state from the sub-power-off state. In this sense, the suspension function can be regarded as a fast activation function (i.e., a function of activating the information processing apparatus fast) or a fast restoration function.

In the following description, a power-off state accompanying at least the restart of the programs will be referred to as a "first power-off state", and a power-off state that does not accompany the restart of the programs will be referred to as a "second power-off state". In the case of the above example, the all-power-off state and the sub-power-off state correspond to examples of the first power-off state, and the suspended state corresponds to an example of the second power-off state. In the case of the above example, in the first power-off state, the devices are reset and the programs are restarted, and in the second power-off state, the devices are not reset and the programs are not restarted. The above-described states of the power supply are examples, and the power-off state accompanying at least the restart of the programs is defined as the first power-off state and the power-off state that does not accompany the restart of the programs is defined as the second power-off state.

In the information processing apparatus according to the present exemplary embodiment, when an operation for turning off the information processing apparatus is performed, the power supply enters the first power-off state or the second power-off state in accordance with a use condition of the information processing apparatus before the operation for turning off the information processing apparatus is performed.

Whether the operation for turning off the information processing apparatus has been performed to eliminate an abnormality that has occurred in the information processing apparatus is estimated on the basis of the use condition, for example, and the power supply enters the first power-off state or the second power-off state on the basis of a result of the estimation.

If the operation for turning off the information processing apparatus is estimated to be an operation for eliminating an abnormality that has occurred in the information processing apparatus, the power supply enters the first power-off state. Since the first power-off state accompanies at least the restart of the programs, the abnormality can be eliminated by restarting the programs.

If the operation for turning off the information processing apparatus is not estimated to be an operation for eliminating an abnormality that has occurred in the information processing apparatus, the power supply enters the second power-off state. The second power-off state does not accompany the restart of the programs. As a result, time taken to restore the power supply becomes shorter than when the power supply is restored to the power-on state from the first power-off state.

An exemplary embodiment will be described hereinafter while taking an image forming apparatus as an example of the information processing apparatus, but an apparatus according to the exemplary embodiment is not limited to the image forming apparatus. The present exemplary embodiment may be applied to an apparatus other than the image forming apparatus, instead.

Figure 1:
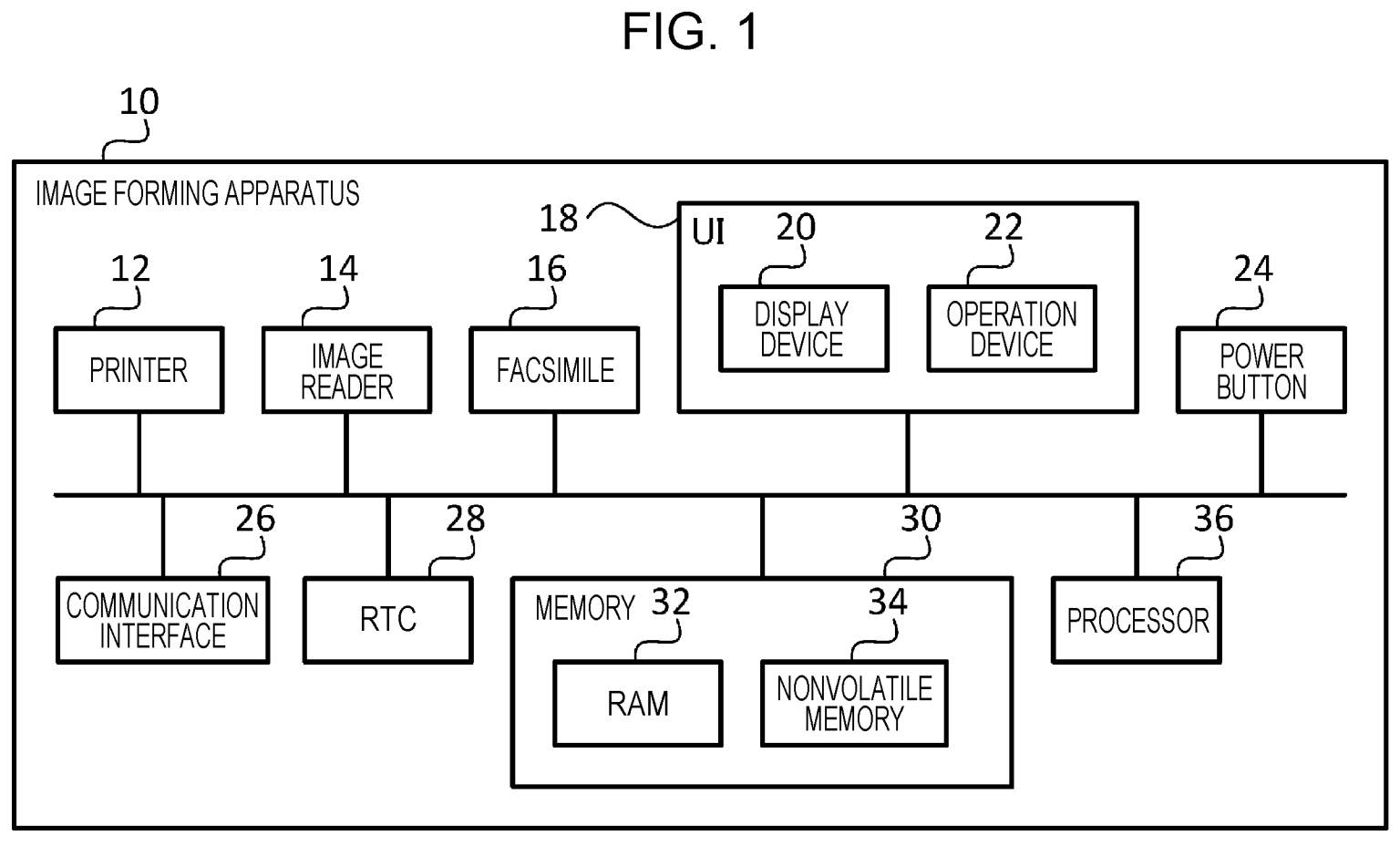

FIG. 1 illustrates the hardware configuration of an image forming apparatus 10, which is an example of the information processing apparatus. The image forming apparatus 10 includes, for example, a printer 12, an image reader 14, a facsimile 16, a user interface (UI) 18, a power button 24, a communication interface 26, a real-time clock (RTC) 28, a memory 30, and a processor 36.

The printer 12 prints images on a recording medium such as sheets of paper. A printing method is not particularly limited, and may be electrophotography, an inkjet method, or the like. The image reader 14 is a scanner, for example, and reads images from sheets of paper or the like. The printer 12 and the image reader 14 together achieve a copying function. The facsimile 16 transmits and receives information using a facsimile function. Although the image forming apparatus 10 includes the printer 12, the image reader 14, and the facsimile 16 in the example illustrated in FIG. 1, the image forming apparatus 10 may include at least the printer 12, the image reader 14, or the facsimile 16, instead. The image forming apparatus 10 may be a multi-function device including some of the printer 12, the image reader 14, and the facsimile 16, instead.

The UI 18 includes, for example, a display device 20 and an operation device 22. The display device 20 is a liquid crystal display, an electroluminescent (EL) display, or the like. The operation device 22 is a keyboard, a mouse, an input key, an operation panel, or the like. The UI 18 may be a touch panel, instead.

The power button 24 is a button for turning on and off the image forming apparatus 10.

As described above, as the states of the power supply of the image forming apparatus 10, for example, the power-on state, the all-power-off state, the sub-power-off state, and the suspended state are defined.

In the suspended state, power is supplied to only the device for detecting pressing of the power button 24 and the RAM 32. Power necessary to hold data is supplied to the RAM 32. When the power supply enters the suspended state from the power-on state, information indicating states of programs executed before the power supply enters the suspended state (i.e., states of programs before the power button 24 is pressed) is stored in the RAM 32. If the power button 24 is pressed and the pressing is detected with the power supply in the suspended state, the power supply is restored to the power-on state from the suspended state, the image forming apparatus 10 is activated. At this time, the programs are not restarted, and are restored to the states stored in the RAM 32.

If the power button 24 is pressed with the power supply of the image forming apparatus 10 in the power-on state, the power supply of the image forming apparatus 10 enters the first power-off state or the second power-off state from the power-on state. For example, the power supply of the image forming apparatus 10 enters the sub-power-off state or the suspended state from the power-on state. This process will be described in detail later.

If the power button 24 is pressed with the power supply of the image forming apparatus 10 in the first power-off state or the second power-off state, the power supply of the image forming apparatus 10 enters the power-on state from the first power-off state or the second power-off state. If the power button 24 is pressed with the power supply of the image forming apparatus 10 in the sub-power-off state, the power supply of the image forming apparatus 10 enters the power-on state from the sub-power-off state. If the power button 24 is pressed with the power supply of the image forming apparatus 10 in the suspended state, the power supply of the image forming apparatus 10 enters the power-on state from the suspended state. More specifically, a process for restoring the devices and a process for restoring the programs are performed. In the process for restoring the devices, power is supplied to the devices. When power is supplied to the devices and the devices have been restored, the devices can be used. In the process for restoring the programs, the programs are activated. When the programs have been activated, the programs can be used. In the suspended state, the programs are restored to the states stored in the RAM 32.

The communication interface 26 includes a communication chip, a communication circuit, or the like and has a function of transmitting information to other apparatuses and a function of receiving information from other apparatuses. The communication interface 26 may have a wireless communication function such as near-field communication or Wi-Fi (registered trademark) or a wireless communication function.

The RTC 28 generates information such as time, date, month, and year from a clock source and outputs the information.

The memory 30 is a device that serves as one or plural storage areas storing data. The memory 30 includes the RAM 32 and a nonvolatile memory 34. As the nonvolatile memory 34, an electrically erasable programmable read-only memory (EEPROM) or a flash memory, for example, is used. The memory 30 also includes a boot read-only memory (ROM) storing a program for activating the image forming apparatus 10. The memory 30 may also include a hard disk drive (HDD), a solid-state drive (SSD), a memory other than the RAM 32, another storage device (e.g., an optical disc), or the like.

The processor 36 controls the operation of the other components of the image forming apparatus 10. For example, the processor 36 controls printing performed by the printer 12, reading of images performed by the image reader 14, transmission and reception of information performed by the facsimile 16, and communication performed by the communication interface 26.

When an operation for turning off the image forming apparatus 10 is performed (e.g., the power button 24 is pressed), the processor 36 changes the state of the power supply to the first power-off state or the second power-off state in accordance with a use condition of the image forming apparatus 10 before the operation for turning off the image forming apparatus 10 is performed.

If a first condition or a second condition, which will be described hereinafter, is satisfied, for example, the processor 36 changes the state of the power supply to the first power-off state, which accompanies the restart of the programs. If the first condition or the second condition is not satisfied, the processor 36 changes the state of the power supply to the second power-off state, which does not accompany the restart of the programs.

First Condition

If, after the image forming apparatus 10 is turned on (e.g., the power button 24 is pressed), an operation for turning off the image forming apparatus 10 is performed without performing an operation for a process to be performed by the image forming apparatus 10, the processor 36 changes the state of the power supply to the first power-off state. The process to be performed by the image forming apparatus 10 is, for example, printing, copying, scanning, facsimile, a service provided over a network, another application, or the like. The operation for the process is, for example, an operation for giving an instruction to perform the process, an operation for making setting relating to the process, or the like. If an operation for turning off the image forming apparatus 10 is performed without executing a job such as a print job or a copy job at all (e.g., without a job execution button being pressed), for example, the processor 36 changes the state of the power supply to the first power-off state. If an operation for turning off the image forming apparatus 10 is performed without performing an operation for setting a job (e.g., without a setting screen being opened or an operation being performed on the setting screen), the processor 36 changes the state of the power supply to the first power-off state. Because it is estimated in this case that the operation for turning off the image forming apparatus 10 has been performed in order to eliminate an abnormality that has occurred in the image forming apparatus 10, the processor 36 changes the state of the power supply to the first power-off state, which accompanies the restart of the programs.

Second Condition

If the same operation that had been performed before a previous operation for turning off the image forming apparatus 10 is performed after the image forming apparatus 10 is turned off and then an operation for turning off the image forming apparatus 10 is performed, the processor 36 changes the state of the power supply to the first power-off state. The same operation refers to an operation for giving an instruction to perform the same process, an operation for making settings for the same process, or the like. If an instruction to execute the same job or the same application is given and then an operation for turning off the image forming apparatus 10 is performed, for example, the processor 36 changes the state of the power supply to the first power-off state. Because it is estimated in this case that the operation for turning off the image forming apparatus 10 has been performed in order to eliminate an abnormality that has occurred in the image forming apparatus 10, the processor 36 changes the state of the power supply to the first power-off state, which accompanies the restart of the programs.

The printer 12, the image reader 14, the facsimile 16, the UI 18, the power button 24, the communication interface 26, the RTC 28, the memory 30, and the processor 36 each correspond to an example of the device included in the image forming apparatus 10.

Figure 2:
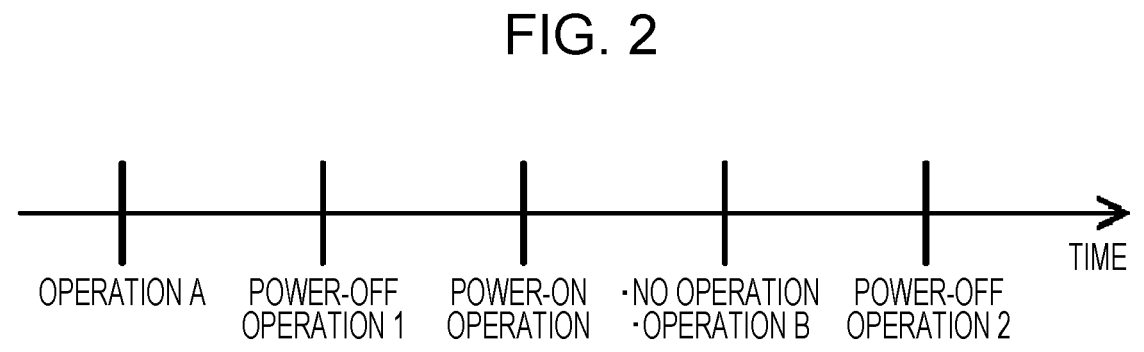

How the image forming apparatus 10 operates will be described hereinafter with reference to FIGS. 2 and 3. FIG. 2 illustrates timings of operations performed on the image forming apparatus 10. A horizontal axis in FIG. 2 represents time. FIG. 3 is a flowchart illustrating how the image forming apparatus 10 operates.

As illustrated in FIG. 2, "operation A", "power-off operation 1", "power-on operation", "no operation or operation B", and "power-off operation 2" are performed in this order.

"Operation A" and "operation B" are performed for a process to be performed by the image forming apparatus 10. "Operation B" might not be performed. That is, an operation for a process might not be performed between "power-on operation" and "power-off operation 2".

"Power-on operation" is an operation for turning on the image forming apparatus 10 and, for example, pressing of the power button 24.

"Power-off operation 1" and "power-off operation 2" are operations for turning off the image forming apparatus 10 and, for example, pressing of the power button 24.

How the image forming apparatus 10 operates will be described hereinafter with reference to FIG. 3 on the basis of the operations illustrated in FIG. 2.

FIG. 3 illustrates a process performed after "off operation 2". When "power-off operation 2" is used as a reference, "power-off operation 1" is a "previous power-off operation", and "power-off operation 2" is a "current power-off operation" in the following description. "Operation A" is an "operation performed before the previous power-off operation". "Operation B" is an "operation performed before the current power-off operation".

In addition, the nonvolatile memory 34 stores information indicating the "operation performed before the previous power-off operation". Here, the nonvolatile memory 34 stores information indicating "operation A" as the information indicating the "operation performed before the previous power-off operation". When "power-off operation 1", which is the "previous power-off operation", is performed, for example, the information indicating "operation A" is stored in the nonvolatile memory 34 as the information indicating the "operation performed before the previous power-off operation".

When the power supply of the image forming apparatus 10 is in the power-on state, the user performs an operation for turning off the image forming apparatus 10 (S01). More specifically, the user presses the power button 24. The operation for turning off the image forming apparatus 10 here is "power-off operation 2", that is, the "current power-off operation".

When the user performs the operation for turning off the image forming apparatus 10, the processor 36 stores, in the nonvolatile memory 34, information indicating an operation performed before the operation for turning off the image forming apparatus 10 (i.e., "power-off operation 2") as information indicating an "operation performed before the current power-off operation" (S02).

If "operation B" was performed before "power-off operation 2", for example, information indicating "operation B" is stored in the nonvolatile memory 34 as the information indicating the "operation performed before the current power-off operation".

If an operation for a process has not been performed between "power-on operation" and "power-off operation 2", for example, information indicating "no operation" is stored in the nonvolatile memory 34 as the information indicating the "operation performed before the current power-off operation".

Next, the processor 36 checks presence or absence of the "operation performed before the current power-off operation" (S03). That is, the processor 36 determines whether an operation had been performed for a process such as a job before the operation for turning off the image forming apparatus 10 was performed after the image forming apparatus 10 was turned on and activated.

If there is no "operation performed before the current power-off operation" (No in S03), the process proceeds to step S04. That is, if the nonvolatile memory 34 stores the information indicating "no operation" as the information indicating the "operation performed before the current power-off operation", the process proceeds to step S04. A case where there is no "operation performed before the current power-off operation" is a case where the first condition is satisfied. That is, if no operation had been performed for a process such as a job before the operation for turning off the image forming apparatus 10 was performed after the image forming apparatus 10 was turned on and activated, the process proceeds to step S04.

If there is an "operation performed before the current power-off operation" (Yes in S03), on the other hand, the process proceeds to step S09. That is, if the nonvolatile memory 34 stores the information indicating "operation B" as the information indicating the "operation performed before the current power-off operation", the process proceeds to step S09.

Processing in step S04 and later steps will be described hereinafter.

The processor 36 updates the "operation performed before the previous power-off operation" stored in the nonvolatile memory 34 to the "operation performed before the current power-off operation" (S04). As a result, the nonvolatile memory 34 stores the information indicating "no operation" as the information indicating the "operation performed before the previous power-off operation".

Next, the processor 36 performs a process for establishing the first power-off state (S05). For example, the processor 36 changes the state of the power supply to the sub-power-off state from the power-on state. As a result, the devices (i.e., hardware) are reset, and the programs are restarted. For example, the information stored in the RAM 32 is deleted.

If an operation for turning on the image forming apparatus 10 is performed (i.e., the power button 24 is pressed) with the power supply in the first power-off state (S06), the processor 36 performs a process for activating the image forming apparatus 10 from the first power-off state (S07). As a result, power is supplied to the devices included in the image forming apparatus 10. When power is supplied to the devices and the devices have been restored, the devices can be used. The programs are also restarted. By performing the process for activating the image forming apparatus 10, the image forming apparatus 10 is activated (S08).

If there is no "operation performed before the current power-off operation", it is estimated that the user performed the operation for turning off the image forming apparatus 10 (S01) in order to eliminate an abnormality that had occurred in the image forming apparatus 10. When an abnormality occurs, the user is expected to turn off and on the image forming apparatus 10 (i.e., an operation for turning on the image forming apparatus 10 immediately after turning off the image forming apparatus 10) in order to eliminate the abnormality. A situation where there is no "operation performed before the current power-off operation" is the same situation as when an operation for turning off and on the image forming apparatus 10 is performed. If there is no "operation performed before the current power-off operation", therefore, it is estimated that the user has turned off the image forming apparatus 10 in order to eliminate an abnormality, and the processor 36 changes the state of the power supply to the first power-off state.

Since the devices are reset and the programs are restarted in step S05, if an abnormality that can be eliminated by restarting the programs has occurred in the image forming apparatus 10, for example, the abnormality is eliminated. If an abnormality that can be eliminated by resetting the devices has occurred in the image forming apparatus 10, the abnormality is eliminated.

Processing in step S09 and later steps will be described hereinafter.

The processor 36 determines whether the "operation performed before the current power-off operation" is the same as the "operation performed before the previous power-off operation" (S09).

If the "operation performed before the current power-off operation" is the same as the "operation performed before the previous power-off operation" (Yes in S09), the process proceeds to step S04. A case where the "operation performed before the current power-off operation" is the same as the "operation performed before the previous power-off operation" is a case where the second condition is satisfied.

If "operation B", which is the "operation performed before the current power-off operation", is the same as "operation A", which is the "operation performed before the previous power-off operation", the process proceeds to step S04. The processor 36 performs the process for establishing the first power-off state (S05). As a result, the devices (i.e., hardware) are reset, and the programs are restarted. The processing in steps S06 to S08 has already been described, and description thereof is omitted.

A case where the "operation performed before the current power-off operation" is the same as the "operation performed before the previous power-off operation" is a case where the second condition is satisfied. That is, if the same operation that had been performed before the previous power-off operation is performed after the image forming apparatus 10 is turned on and then an operation for turning off the image forming apparatus 10 is performed, the process proceeds to step S04. If the "operation performed before the current power-off operation" is the same as the "operation performed before the previous power-off operation", it is estimated that the user performed the operation for turning off the image forming apparatus 10 (S01) in order to eliminate an abnormality that had occurred in the image forming apparatus 10. That is, when the same operation has been performed twice in a row, it is estimated that a process was not performed due to an abnormality and that the user has performed an operation for turning off the image forming apparatus 10 in order to eliminate the abnormality. The processor 36, therefore, changes the state of the power supply to the first power-off state.

Since the devices are reset and the programs are restarted in step S05, if an abnormality that can be eliminated by restarting the programs has occurred in the image forming apparatus 10, for example, the abnormality is eliminated. If an abnormality that can be eliminated by resetting the devices has occurred in the image forming apparatus 10, the abnormality is eliminated.

If the "operation performed before the current power-off operation" is not the same as the "operation performed before the previous power-off operation" (No in S09), the process proceeds to step S10. If "operation B", which is the "operation performed before the current power-off operation", is different from "operation A", which is the "operation performed before the previous power-off operation", for example, the process proceeds to step S10.

The processor 36 updates the "operation performed before the previous power-off operation" stored in the nonvolatile memory 34 to the "operation performed before the current power-off operation" (S10). As a result, the information indicating "operation B" is stored in the nonvolatile memory 34 as the information indicating the "operation performed before the previous power-off operation".

Next, the processor 36 performs a process for establishing the second power-off state (S11). For example, the processor 36 changes the state of the power supply to the suspended state from the power-on state.

In the second power-off state (i.e., the suspended state), power is supplied to only the device for detecting pressing of the power button 24 and the RAM 32. Power necessary to hold data is supplied to the RAM 32. When the power supply enters the suspended state from the power-on state, information indicating states of programs executed before the power supply enters the suspended state (i.e., states of programs executed before the power button 24 is pressed) is stored in the RAM 32.

If an operation for turning on the image forming apparatus 10 is performed (e.g., if the power button 24 is pressed) with the power supply in the second power-off state (S12), the processor 36 performs a process for activating the image forming apparatus 10 from the second power-off state (S13). As a result, power is supplied to the devices included in the image forming apparatus 10. When power is supplied to the devices and the devices have been restored, the devices can be used. The programs are not restarted, and are restored to the states stored in the RAM 32. By performing the process for activating the image forming apparatus 10, the image forming apparatus 10 is activated (S08). Since the image forming apparatus 10 is restored to the power-on state from the second power-off state, time taken to restore the power supply is shorter than when the power supply is restored to the power-on state from the first power-off state.

If neither the first condition or the second condition is satisfied, it is not assumed that the user has turned off the image forming apparatus 10 in order to eliminate an abnormality that has occurred in the image forming apparatus 10. By changing the state of the power supply to the second power-off state in this case, faster activation than in the case of restoration from the first power-off state can be performed.

Modification of First Condition

The processor 36 may change the state of the power supply to the first power-off state in accordance with a condition obtained by modifying the first condition, which will be described hereinafter.

If, after the image forming apparatus 10 is turned on, an operation for turning off the image forming apparatus 10 is performed within a predetermined period of time without performing an operation for a process (e.g., a job) to be performed by the image forming apparatus 10, the processor 36 may change the state of the power supply to the first power-off state, instead. If an instruction to perform a process such as a job has not been given or an operation for making settings for a process is performed within the predetermined period of time, for example, the processor 36 changes the state of the power supply to the first power-off state.

In FIG. 3, if an operation for turning off the image forming apparatus 10 (S10) is performed within the predetermined period of time after the image forming apparatus 10 was turned on and if there is no "operation performed before the current power-off operation" (No in S03), the processor 36 changes the state of the power supply to the first power-off state.

If an operation for turning off the image forming apparatus 10 is performed within the predetermined period of time without performing an operation for a process, the operation for turning off the image forming apparatus 10 is estimated to be an operation for eliminating an abnormality that has occurred in the image forming apparatus 10. The processor 36, therefore, changes the state of the power supply to the first power-off state.

First Specific Example of Second Condition

The "same operation" in the second condition, that is, the "same operation" as one that was performed before the previous power-off operation, refers to, for example, an instruction to perform the same process. More specifically, an instruction to execute the same job (e.g., a print job or a copy job) or the same application is an example of the "same operation".

If the "operation performed before the current power-off operation" is a print job and the "operation performed before the previous power-off operation" is a print job (Yes in S09), the process proceeds to step S04. In this case, the power supply enters the first power-off state.

If the "operation performed before the current power-off operation" is a print job and the "operation performed before the previous power-off operation" is a copy job (No in S09), on the other hand, the process proceeds to step S10. In this case, the power supply enters the second power-off state.

Second Specific Example of Second Condition

The "same operation" in the second condition may refer to an instruction to perform a process belonging to the same category. A process belonging to the same category is a process employing the same technique.

"Scan to email", for example, is a service for transmitting image data generated through scanning performed by the image reader 14 to a destination by email.

"Scan to box" is a service for storing image data generated through scanning performed by the image reader 14 in a specified storage area (e.g., a folder). The specified storage area is formed in a storage device included in the image forming apparatus 10 or the like.

"Scan to PC" is a service for transmitting image data generated through scanning performed by the image reader 14 to a specified terminal apparatus such as a personal computer (PC) or a smartphone.

Since "scan to email", "scan to box", and "scan to PC" are processes employing the same technique, namely scanning, these processes can be regarded as belonging to the same category (e.g., scanning category).

A "service for obtaining image data from a PC and printing the image data", for example, is achieved through printing performed by the printer 12. Similarly, a "service for obtaining image data stored in a cloud server and printing the image data" is achieved through printing performed by the printer 12. Since these services are processing employing the same technique, namely printing performed by the printer 12, the processes can be regarded as belonging to the same category (e.g., printing category).

If the "operation performed before the current power-off operation" is "scan to email" and the "operation performed before the previous power-off operation" is "scan to box" (Yes in S09), for example, the process proceeds to step S04. In this case, the power supply enters the first power-off state.

If the "operation performed before the current power-off operation" is "scan to email" and the "operation performed before the previous power-off operation" is the "service for obtaining image data from a PC and printing the image data" (No in S09), on the other hand, the process proceeds to step S10. In this case, the power supply enters the second power-off state.

Third Specific Example of Second Condition

The "process belonging to the same category" may be a process employing the same device.

"Scan to email" and the "service for obtaining image data stored in a cloud server and printing the image data", for example, are processes employing the same device, namely the communication interface 26. These processes, therefore, can be regarded as belonging to the same category.

"Scan to box" (e.g., a service for storing, in the image forming apparatus 10, image data generated through scanning without transmitting the image data to an external apparatus) and "printing" are processes that do not employ the same device. In "scan to box", the image reader 14 is used, and in "printing", the printer 12 and the communication interface 26 are used. In addition, since image data is stored in the image forming apparatus 10 in "scan to box" here, the communication interface 26 is not used. These processes thus do not employ the same device.

If the "operation performed before the current power-off operation" is "scan to email" and the "operation performed before the previous power-off operation" is the "service for obtaining image data stored in a cloud server and printing the image data" (Yes in S09), the process proceeds to step S04. In this case, the power supply enters the first power-off state.

If the "operation performed before the current power-off operation" is "scan to box", where image data is stored in the image forming apparatus 10, and the "operation performed before the previous power-off operation" is "printing" (No in S09), on the other hand, the process proceeds to step S10. In this case, the power supply enters the second power-off state.

Specific examples will be described hereinafter.

First Example

For example, a memory leak had occurred in the programs of the image forming apparatus 10, but the image forming apparatus 10 had not recognized the occurrence of the memory leak. The image forming apparatus 10 was operating, but performance thereof had deteriorated due to the memory leak.

The user noticed the deterioration of performance while using the image forming apparatus 10, and performed an operation for turning off and on the image forming apparatus 10 in order to eliminate an abnormality that had occurred in the image forming apparatus 10.

Neither the first condition or the second condition was satisfied, and the power supply of the image forming apparatus 10 entered the second power-off state. An operation for turning on the image forming apparatus 10 was then performed, and the image forming apparatus 10 was activated. Since this was restoration from the second power-off state, the programs were not restarted, and the memory leak was not eliminated.

The user then noticed, while using the UI 18, that the deterioration of performance had not been eliminated, and performed an operation for turning off and on the image forming apparatus 10 again. After the image forming apparatus 10 was turned on, the operation for turning off and on the image forming apparatus 10 was performed without performing an operation for a job or the like. That is, this situation satisfied the first condition. In this case, the processor 36 determined that the user had used the power button 24 in order to eliminate the abnormality, and changed the state of the power supply to the first power-off state. As a result, the devices were reset and the programs were restarted, thereby eliminating the memory leak.

The user then performed an operation for turning on the image forming apparatus 10 to activate the image forming apparatus 10, recognized that the deterioration of performance due to the memory leak had been eliminated, and used the image forming apparatus 10.

Second Example

An abnormality had occurred in the devices of the image forming apparatus 10, and even when a network cable was connected to the image forming apparatus 10, the connection was not recognized.

The user used the UI 18 to give an instruction to perform "scan to email" (i.e., the service for transmitting image data generated through scanning performed by the image reader 14 to a destination by email), but "scan to email" was not performed due to no connection to a network. The instruction to perform "scan to email" at this time corresponds to the "operation performed before the previous power-off operation" (e.g., "operation A").

The user checked that the network cable was physically connected, determined that an abnormality had occurred in the image forming apparatus 10, and performed an operation for turning off and on the image forming apparatus 10. The operation for turning off and on the image forming apparatus 10 corresponds to a combination of "power-off operation 1" and "power-on operation".

Neither the first condition or the second condition was satisfied and an abnormality was not detected, the power supply of the image forming apparatus 10 entered the second power-off state. An operation for turning on the image forming apparatus 10 was then performed, and the image forming apparatus 10 was activated. Since this was restoration from the second power-off state, the devices were not reset, and the abnormality in the network was not eliminated.

Thinking that the abnormality had been eliminated after performing the operation for turning off and on the image forming apparatus 10, the user again gave an instruction to perform "scan to email". The abnormality, however, had not been eliminated, and "scan to email" was not performed. The instruction to perform "scan to email" at this time corresponds to the "operation performed before the current power-off operation" (e.g., "operation B").

The user then performed an operation for turning off the image forming apparatus 10. The "operation for turning off the image forming apparatus 10" at this time corresponds to "power-off operation 2".

The nonvolatile memory 34 stored information indicating that the "operation performed before the previous power-off operation" was the instruction to perform "scan to email", and the "operation performed before the current power-off operation", too, was the instruction to perform "scan to email". The operation for turning off the image forming apparatus 10 was performed after the instruction to perform "scan to email". The processor 36, therefore, determined that the user had used the power button 24 to eliminate the abnormality, and changed the state of the power supply to the first power-off state. As a result, the devices were reset and the programs were restarted, thereby eliminating the abnormality that had occurred in the devices.

The user then performed an operation for turning on the image forming apparatus 10 to activate the image forming apparatus 10 and gave an instruction to perform "scan to email". "Scan to email" was performed normally, and the user recognized that the process was performed normally.

The above-described first and second examples are just examples, and even in the same situation as in the first or second example, the power supply enters the first power-off state if the first condition or the second condition is satisfied.

An abnormality that has occurred in the image forming apparatus 10 can thus be eliminated.

The functions of the image forming apparatus 10 are achieved, for example, through cooperation between hardware and software. For example, the processor 36 of the image forming apparatus 10 reads a program stored in the memory 30 and executes the program to achieve the functions of the image forming apparatus 10. The program is stored in the memory via a storage medium such as a compact disc (CD) or a digital versatile disc (DVD) or via a communication path such as a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))
    An information processing apparatus comprising:
    a processor,
        wherein a first power-off state, which accompanies a restart of a program, and a second power-off state, which does not accompany the restart of the program, are defined as states of a power supply of the information processing apparatus, and
        wherein the processor is configured to change, if an operation for turning off the information processing apparatus is performed, a state of the power supply to the first power-off state or the second power-off state in accordance with a use condition of the information processing apparatus before the operation for turning off the information processing apparatus is performed.

(((2)))
    The information processing apparatus according to (((1))),
        wherein the processor is configured to change the state of the power supply to the first power-off state if, after the information processing apparatus is turned on, an operation for turning off the information processing apparatus is performed without performing an operation for a process to be performed by the information processing apparatus.

(((3)))
    The information processing apparatus according to (((2))),
        wherein the processor is configured to change the state of the power supply to the first power-off state if, after the information processing apparatus is turned on, an operation for turning off the information processing apparatus is performed within a predetermined period of time without performing an operation for the process.

(((4)))
    The information processing apparatus according to (((1))),
        wherein the processor is configured to change the state of the power supply to the first power-off state if, after the information processing apparatus is turned on, a same operation that had been performed before a previous power-off operation is performed and then an operation for turning off the information processing apparatus is performed.

(((5)))
    The information processing apparatus according to (((4))),
        wherein the same operation is an instruction to perform a same process.

(((6)))
    The information processing apparatus according to (((4))),
        wherein the same operation is an instruction to perform a process belonging to a same category.

(((7)))
    The information processing apparatus according to (((6))),
        wherein the process belonging to the same category is a process employing a same device.

(((8)))
    A program causing a computer that controls an apparatus for which a first power-off state, which accompanies a restart of a program, and a second power-off state, which does not accompany the restart of the program, are defined to execute a process comprising:
        change, if an operation for turning off the apparatus is performed, a state of the power supply to the first power-off state or the second power-off state in accordance with a use condition of the apparatus before the operation for turning off the apparatus is performed.

What is claimed is:

1. An information processing apparatus comprising:
    a processor,
        wherein a first power-off state, which accompanies a restart of a program, and a second power-off state, which does not accompany the restart of the program, are defined as states of a power supply of the information processing apparatus, and apparatus,
        wherein the processor is configured to change, if an operation for turning off the information processing apparatus is performed, a state of the power supply to the first power-off state or the second power-off state in accordance with a use condition of the information processing apparatus before the operation for turning off the information processing apparatus is performed,
        wherein the processor is configured to change the state of the power supply to the first power-off state if, after the information processing apparatus is turned on, an operation for turning off the information processing apparatus is performed without performing an operation for a process to be performed by the information processing apparatus, and wherein the processor is configured to change the state of the power supply to the first power-off state if, after the information processing apparatus is turned on, an operation for turning off the information processing apparatus is performed within a predetermined period of time without performing an operation for the process.

2. The information processing apparatus according to claim 1, wherein the processor is configured to change the state of the power supply to the first power-off state if, after the information processing apparatus is turned on, a same operation that had been performed before a previous power-off operation is performed and then an operation for turning off the information processing apparatus is performed.

3. The information processing apparatus according to claim 2, wherein the same operation is an instruction to perform a same process.

4. The information processing apparatus according to claim 2, wherein the same operation is an instruction to perform a process belonging to a same category.

5. The information processing apparatus according to claim 4, wherein the process belonging to the same category is a process employing a same device.

6. A non-transitory computer readable medium storing a program causing a computer that controls an apparatus for which a first power-off state, which accompanies a restart of a program, and a second power-off state, which does not accompany the restart of the program, are defined to execute a process comprising:

change, if an operation for turning off the apparatus is performed, a state of the power supply to the first power-off state or the second power-off state in accordance with a use condition of the apparatus before the operation for turning off the apparatus is performed, change the state of the power supply to the first power-off state if, after the information processing apparatus is turned on, an operation for turning off the information processing apparatus is performed without performing an operation for a process to be performed by the information processing apparatus, and change the state of the power supply to the first power-off state if, after the information processing apparatus is turned on, an operation for turning off the information processing apparatus is performed within a predetermined period of time without performing an operation for the process.

7. A method used by an apparatus for which a first power-off state, which accompanies a restart of a program, and a second power-off state, which does not accompany the restart of the program, are defined, the method comprising:

changing, if an operation for turning off the apparatus is performed, a state of the power supply to the first power-off state or the second power-off state in accordance with a use condition of the apparatus before the operation for turning off the apparatus is performed, changing the state of the power supply to the first power-off state if, after the information processing apparatus is turned on, an operation for turning off the information processing apparatus is performed without performing an operation for a process to be performed by the information processing apparatus, and changing the state of the power supply to the first power-off state if, after the information processing apparatus is turned on, an operation for turning off the information processing apparatus is performed within a predetermined period of time without performing an operation for the process.

* * * * *